(12) United States Patent
Pesquera et al.

(10) Patent No.: US 11,131,687 B2
(45) Date of Patent: Sep. 28, 2021

(54) ACCELEROMETER SENSOR WITH A PROTECTIVE SLEEVE FOR ELECTRIC CABLES

(71) Applicants: Continental Automotive France, Toulouse (FR); Continental Automotive GmbH, Hannover (DE)

(72) Inventors: Gil Pesquera, Toulouse (FR); Jéroen Van Est, Montgiscard (FR); Antoine Pianu, Pompignan (FR)

(73) Assignees: Continental Automotive France; Continental Automotive GmbH

( * ) Notice: Subject to any disclaimer, the term of this patent is extended or adjusted under 35 U.S.C. 154(b) by 68 days.

(21) Appl. No.: 16/482,392

(22) PCT Filed: Mar. 14, 2018

(86) PCT No.: PCT/FR2018/050598
§ 371 (c)(1),
(2) Date: Jul. 31, 2019

(87) PCT Pub. No.: WO2018/172662
PCT Pub. Date: Sep. 27, 2018

(65) Prior Publication Data
US 2020/0025791 A1 Jan. 23, 2020

(30) Foreign Application Priority Data
Mar. 24, 2017 (FR) ...................................... 1752455

(51) Int. Cl.
*G01P 15/08* (2006.01)
*G01L 23/22* (2006.01)
*G01P 15/09* (2006.01)

(52) U.S. Cl.
CPC .......... *G01P 15/0802* (2013.01); *G01L 23/22* (2013.01); *G01P 15/0907* (2013.01)

(58) Field of Classification Search
CPC .. G01P 15/0802; G01P 15/0907; G01L 23/22; H02G 3/088; H02G 15/013; G02G 15/043
See application file for complete search history.

(56) References Cited

U.S. PATENT DOCUMENTS 4,599,487 A * 7/1986 Blank .................. H02G 15/013
174/151
4,847,557 A * 7/1989 Saito ........................ G01V 3/10
324/207.13

(Continued)

FOREIGN PATENT DOCUMENTS

DE 102010039494 A1 2/2012
EP 1571427 A1 9/2005

OTHER PUBLICATIONS

International Search Report and Written Opinion for International Application No. PCT/FR2018/050598, dated May 8, 2018—9 pages.

*Primary Examiner* — Helen C Kwok
(74) *Attorney, Agent, or Firm* — RatnerPrestia

(57) ABSTRACT

An accelerometer sensor with a protective sleeve for electric cables, the sensor having a base forming a body, a plastic coating being overmolded around an external wall of the base and around an end portion of the sleeve adjacent to the connecting pin. The end portion of the sleeve is surrounded by a connecting element at least partially embedded in the overmolding material and having, on the one hand, an anchorage to the sleeve which are arranged on the connecting element facing the end portion of the sleeve and, on the other hand, a retainer of a portion of overmolding material or bonding to the portion of overmolding material enveloping the end portion of sleeve.

11 Claims, 2 Drawing Sheets

(56) References Cited

U.S. PATENT DOCUMENTS

| | | | | |
|---|---|---|---|---|
| 5,046,857 A | * | 9/1991 | Metzger | G01K 7/22 |
| | | | | 374/135 |
| 5,302,138 A | * | 4/1994 | Shields | H01R 13/6683 |
| | | | | 439/527 |
| 5,635,678 A | * | 6/1997 | Yasukuni | H02G 3/088 |
| | | | | 156/48 |
| 5,749,656 A | * | 5/1998 | Boehm | G01K 7/22 |
| | | | | 338/28 |
| 6,433,275 B1 | * | 8/2002 | Rittmann | H05K 5/06 |
| | | | | 174/50 |
| 10,218,164 B2 | * | 2/2019 | Kruger | H02G 15/043 |
| 10,530,139 B2 | * | 1/2020 | Wyss | G01F 1/05 |
| 2005/0193838 A1 | | 9/2005 | Valles | |
| 2008/0196919 A1 | | 8/2008 | Steinich | |
| 2008/0204007 A1 | * | 8/2008 | Kim | G01D 11/30 |
| | | | | 324/207.25 |
| 2015/0355213 A1 | | 12/2015 | Kobayashi et al. | |

* cited by examiner

ACCELEROMETER SENSOR WITH A PROTECTIVE SLEEVE FOR ELECTRIC CABLES

CROSS REFERENCE TO RELATED APPLICATIONS

This application is the U.S. National Phase Application of PCT International Application No. PCT/FR2018/050598, filed Mar. 14, 2018, which claims priority to French Patent Application No. 1752455, filed Mar. 24, 2017, the contents of such applications being incorporated by reference herein.

FIELD OF THE INVENTION

The present invention relates to an accelerometer sensor with a protective sleeve for electric cables, used particularly in the automotive field as knock sensors. Other applications in the automotive field are, however, possible, such as, for example, wheel speed sensors known as wheel units, camshaft sensor or crankshaft sensor or any type of sensor subjected to high temperatures of around 150° C. or more.

BACKGROUND OF THE INVENTION

The accelerometer sensor has a base forming a body containing within it the electronic and electrical components of the sensor. A connecting pin projects from the base and is connected to two electric cables surrounded with the protective sleeve. During the manufacture of the accelerometer sensor, a plastic coating is overmolded around an external wall of the base, around the connecting pin and around an end portion of the sleeve adjacent to the connecting pin.

It is necessary to ensure a perfect seal between the overmolded coating and the sleeve of the cables in order to avoid any ingress of water where the sleeve meets the coating. Formerly, the sleeve material was polyurethane and the coating was glass-fiber reinforced polyamide 6,6 or P66. Sealing problems were already liable to arise where the sleeve met the coating given that these two materials are not optimally compatible.

It is therefore commonplace for wired sensors such as knock sensors to be overmolded with an overmolding material different from the material of the protective sleeve of the cables. Because the materials of the sleeve and of the overmolded coating of the sensor are different, there is no bonding at the interface between the sleeve and coating. There is also the risk that the sleeve may slip during the various thermal cycles, and so there are problems with the retention of the sleeve in the coating in addition to the problems with sealing.

These problems are amplified with a new set of specifications imposed by automotive manufacturers. Specifically, there is now a requirement for the sleeve to be able to withstand temperatures of as much as at least 150° C. It has therefore become necessary to change the sleeve material from polyurethane to a silicone-based material.

The presence of silicone in the sleeve in order to improve its ability to withstand the high temperatures does, however, lead to slippage of the sleeve with respect to the overmolded coating of the base of the accelerometer sensor and sleeve/coating separations are increasingly frequent. In addition, the silicone-based material is even less compatible with the overmolding material than was polyurethane, and the bonding between the sleeve and the coating is even further reduced, thereby reducing the sealing where the sleeve makes contact with the coating.

It has been proposed to grind the outside of the protective sleeve in order to create roughnesses on the exterior periphery of the sleeve, so as to improve the keying of the sleeve to the coating obtained by overmolding. It has also been proposed for the sleeve to undergo a plasma treatment. This has not proved entirely satisfactory.

SUMMARY OF THE INVENTION

The problem underlying the present invention is, for an accelerometer sensor from which a sleeve for electric cables protrudes, the sensor having a base overmolded in a plastic coating which also coats and end portion of the sleeve emerging from the sensor, that of guaranteeing sealing where the coating meets the sleeve and of ensuring that the end portion of the sleeve is held in the coating.

To this end, an aspect of the present invention relates to an accelerometer sensor with a protective sleeve for electric cables, the sensor having a base forming a body containing the electronic and electrical components of the sensor, a connecting pin projecting from the base and being connected to two electric cables surrounded with the protective sleeve, a plastic coating being overmolded around an external wall of the base, around the connecting pin and around an end portion of the sleeve adjacent to the connecting pin, notable in that said end portion of the sleeve is surrounded by a connecting element at least partially embedded in the overmolding material and having, on the one hand, means of anchorage to the sleeve which are arranged on the connecting element facing the end portion of the sleeve and, on the other hand, means of retention of a portion of overmolding material or means of bonding to the portion of overmolding material enveloping said end portion of sleeve.

The technical effect obtained is a reinforced both mechanical and chemical connection between the sleeve and the coating. This is obtained by means of the connecting element which is, on the one hand, secured to the sleeve by the mechanical anchoring means and which is embedded in the overmolding material while on the other hand having improved bonding to the overmolding material.

The anchoring means are specifically suited to the sleeve by being essentially mechanical, whereas the bonding or retention means for bonding or retention with respect to the overmolding material are specific to the overmolding material and may be mechanical, such an grooves or spaces that accept overmolding material and the edges of which act as end stops against the overmolding material leaving these grooves or these spaces.

It is also possible to employ means of bonding between at least part of a material of the connecting element and the overmolding material, either by means of compatibility between the overmolding material and at least one layer of material of the connecting element, for example by re-melting a material borne by the connecting element into the overmolding material, the two materials having similar melting points, or by any other mixing of a material with which the connecting element is coated with the overmolding material.

Advantageously, the anchoring means of the connecting element are means for gripping or locally penetrating said end portion of the sleeve by locally penetrating the sleeve. The sleeve may be made of a readily deformable plastic which can be locally pierced by the penetration means borne by the anchoring means.

This anchorage may also be achieved by screwing the connecting element, twisting it onto the sleeve before securing it to the sensor, for example using screw threads internal to the connecting element passing around the sleeve and embedding in the material of the sleeve. The connecting element may therefore be mounted on the sleeve by force or by twisting. It is also possible to provide a connecting element that can open up as it is mounted on the sleeve and be closed against the sleeve when this element has an opening for fitting it in order to allow the sleeve to enter it.

Advantageously, the means ensuring bonding between the connecting element and the portion of overmolding material of the coating are means of chemical bonding between a material of at least part of the connecting element and the overmolding material and the retaining means are means for inserting overmolding material into the connecting element. The connecting element may thus be coated with a layer of a material that encourages same to bond with the overmolding material while at the same time having a body made from a different material. It is this layer for example which forms the aforementioned part of the connecting element.

Advantageously, the material of said at least part of the connecting element has a melting point within plus or minus 15° C. of the melting point of the overmolding material. That allows said at least part of the connecting element, for example a layer of material facing the overmolding material, to melt on contact with the overmolding material and obtain a secure fused connection between the two materials, of the layer and of the overmolding.

Advantageously, said at least part of the connecting element is in the form of at least two fins in the shape of tapering spikes with a vertex angle of 10° to 30° and a length varying from 0.7 to 1.5 mm. This embodiment is preferred for obtaining the best remelting of the material of said at least part of the connecting element. The use of fins that are slender and elongate allows these fins to reach their melting point more quickly upon contact with the overmolding material. The material of these fins mixes with the material of the coating, because the two materials are compatible, yielding zones consisting of a mixture of these two materials, making it possible to guarantee sealing between coating and protective sleeve. The retention of the sleeve by the coating is also improved as a result.

In the case of the protective sleeve, the melt preferably affects only the fins and not the rest of the connecting element, thereby ensuring that the properties of anchorage of the connecting element to the sleeve are maintained. This can be regulated by having fin thicknesses that are slender enough that the fins can melt and an overmolding temperature that must not cause the rest of the connecting element to melt. This is why it may be advantageous, although not compulsory, to have fins made from a different material from the rest of the connecting element.

In a first embodiment of the connecting element, this connecting element is in the form of a helical spring with turns forcibly engaged on said end portion of sleeve with, at the internal periphery of the spring, the turns of the spring facing said portion gripping said end portion of the sleeve by static radial compression and, at the external periphery of the spring, overmolding material entering a space between the turns as the coating is overmolded, the turns exerting a retaining action on the overmolding material that has entered the space between the turns. Such a spring simultaneously secures to the sleeve and the overmolding material respectively.

Advantageously, the internal periphery of the spring bears spikes directed toward said end portion of sleeve. This increases the anchorage of the spring on the protective sleeve.

Advantageously, the helical spring has a body made of steel or of a polyamide 66 which may or may not be covered, facing the coating, with a layer of a material that chemically bonds to the overmolding material. The layer of a material that chemically bonds to the overmolding material, when present, enhances the bonding between the spring and the overmolding material as well as the retention of the overmolding material between the turns of the spring. In the case of a spring made of polyamide 66, there is no need to provide such a layer because the overmolding material is quite often polyamide 66 and therefore compatible in remelt with the material of the spring in this case.

In other forms of embodiment of the connecting element, this connecting element is in the form of a clamping ring or of a member returned elastically to a clamping position, the ring or the member at least partially surrounding the sleeve, an internal periphery of the ring or of the member comprising a screw thread or one or more striations engaging in said end portion of the sleeve and an external periphery of the ring or of the member comprising at least one groove, overmolding material entering said at least one groove during overmolding.

Advantageously, the clamping ring or the member are at least partially made from a plastic that chemically bonds to the overmolding material. The advantages mentioned hereinabove for a layer applied to the spring facing the overmolding material also apply to such a ring or member, it being possible for the ring or the member to be made entirely of polyamide 66, particularly when the overmolding material is polyamide 66.

BRIEF DESCRIPTION OF THE DRAWINGS

Other features, objects and advantages of aspects of the present invention will become apparent upon reading the detailed description that will follow and upon examining the appended drawings, given by way of nonlimiting examples and in which.

DETAILED DESCRIPTION OF THE PREFERRED EMBODIMENTS

In what will follow, for an accelerometer sensor, the base refers to the median body of the sensor having a barrel and a central bore for the passage of a fixing element, this being without coating of plastic and without acceleration measurement element, such as, for example, piezoelectric rings and their associated elements.

The words outer or external to the barrel or to the base refer to a portion of the barrel or of the base that is furthest from the central bore passing through this barrel or this base.

Figure 1:
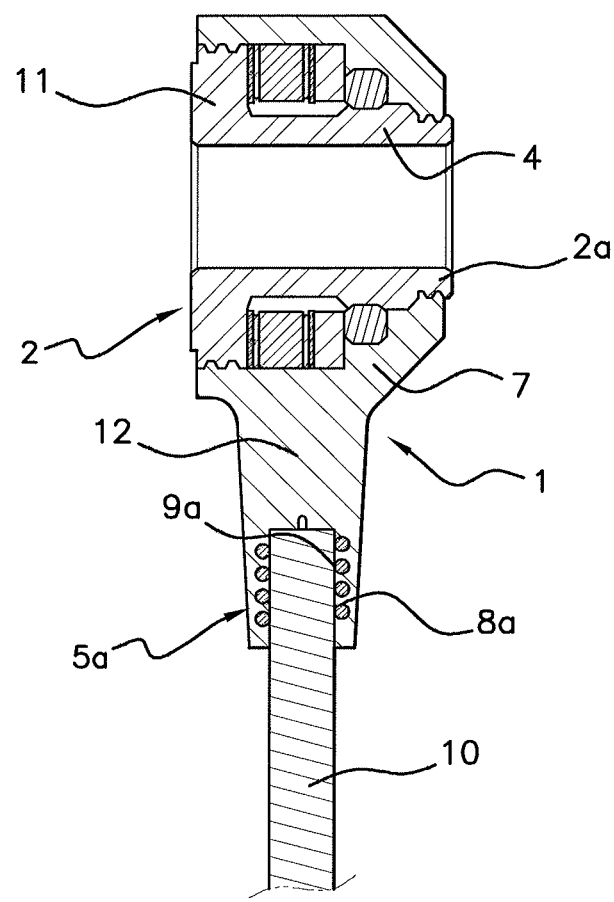
FIG. 1 is a schematic depiction of a view in cross section of an accelerometer sensor with protective sleeve for electric cables, the sensor being according to one embodiment according to an aspect of the present invention and bearing a spring by means of a first way of embodying a connecting element, on the one hand, anchored in an end portion of the sleeve and, on the other hand, retaining the overmolding material of the surrounding coating, an end portion of sleeve also being overmolded in this coating.

With reference to the figures and more particularly to FIG. 1, an aspect of the present invention relates to an accelerometer sensor 1, more particularly a knock sensor or camshaft or crankshaft sensor. Aspects of present invention are not restricted to any particular sensor but applies to any sensor that has a body exhibiting a coating 7 overmolded around the body, the sensor 1 being connected to a sleeve 10 for protecting electric cables projecting from the sensor 1 and a portion of which is overmolded with the coating 7. In the conventional way, such an accelerometer sensor 1 comprises a base 2 that forms the main body of the sensor 1.

The base 2 comprises a barrel 2a having a central bore 4 able to accept a fixing element intended for securing the accelerometer sensor 1 against a support element, for example a crankcase of an internal combustion engine in the case of a knock sensor 1. It is known practice to overmold a plastic coating 7 around an external wall of the base 2 and therefore to partially surround the base 2.

The features that will be described hereinafter are not essential to an aspect of the present invention but are given for illustrative and nonlimiting purposes. It is known that the sensor 1 has piezoelectric members, one end of each member supporting an inertial mass. The members are housed in a cavity formed between the coating 7 and the base 2.

In one embodiment of the piezoelectric members and of the housing thereof, the cavity has a support flange 11 formed by a portion of the external wall of the barrel 2a projecting radially from the base 2.

This flange 11 supports a piezoelectric member surrounded by contact rings acting as electrodes, washers and a seismic mass, these all forming a stack.

In order to hold this stack in place, it is possible to bond these elements together, in which case the accelerometer sensor 1 is referred to as glue-mounted, or to screw these elements onto the base 2, in which case the accelerometer sensor 1 is said to be screw-mounted.

By way of an essential feature of an aspect of the present invention, the sensor 1 is connected to a sleeve 10 that protects electric cables. In the nonlimiting example shown in FIG. 1, at least one electrical connecting pin connected to each of the contact rings passes through the coating 7 toward the outside of the accelerometer sensor 1 via a protective bushing 12 that forms part of the coating 7 or is overmolded in the coating 7.

More generally, the accelerometer sensor 1 with protective sleeve 10 for electric cables has a base 2 forming a body containing the electronic and electrical components of the sensor 1. A connecting pin projects from the base 2 and is connected to two electric cables surrounded with the protective sleeve 10, a plastic coating 7 being overmolded around an external wall of the base 2, around the connecting pin forming a protective bushing 12, and around an end portion of the sleeve 10 adjacent to the connecting pin.

In such an arrangement, it has been found that there is a lack of sealing between, on the one hand, the coating 7, considered in its entirety comprising the protective bushing and, on the other hand, the end portion of sleeve 10, as well as a possibility for slippage of the sleeve 10 out of the coating 7 especially when the sleeve 10 is made of a silicone-based material.

With reference to all the figures, in order to overcome that, an aspect of the present invention proposes for the end portion of the sleeve 10 to be surrounded by a connecting element 5a, 5b, 5c, 5d at least partially embedded in the overmolding material. The connecting element 5a, 5b, 5c, 5d has, on the one hand, means 9a, 9b, 9c of anchorage to the sleeve 10 which are arranged on the connecting element 5a, 5b, 5c, 5d facing the end portion of the sleeve 10 and, on the other hand, means 8a, 8b of retention of a portion of overmolding material or means 3 of bonding to the portion of overmolding material enveloping said end portion of sleeve 10.

The connecting element 5a, 5b, 5c, 5d may adopt various forms. Nonlimitingly, in FIG. 1, the connecting element 5a, 5b, 5c, 5d is a spring 5a, in FIG. 2, the connecting element 5a, 5b, 5c, 5d is a ring 5b having a complete and closed circumference, in FIG. 3, a two-part ring 5c, and a member 5d open at its periphery and returned elastically to a clamping position in FIG. 4. In general, a connecting element 5a, 5b, 5c, 5d passes right around the end portion of the sleeve 10 overmolded with the coating 7.

The anchoring means 9a, 9b, 9c may take various forms. For example, the anchoring means 9a, 9b, 9c of the connecting element 5a, 5b, 5c, 5d may be means 9c for gripping or 9a, 9b for locally penetrating the end portion of the sleeve 10 by locally penetrating this end portion of the sleeve 10.

For example, FIG. 1 illustrates, for the spring 5a by way of connecting element, penetration means in the form of spikes 9a, just one of which has been referenced, the spikes 9a being directed toward the end portion of sleeve 10. The spring may be in the form of a helical spring 5a with turns forcibly engaged on the end portion of sleeve 10.

At the internal periphery of the spring 5a, the turns of the spring facing the sleeve 10 may grip the end portion of the sleeve 10 by static radial compression. At the external periphery of the spring 5a, overmolding material may enter a space 8a between the turns as the coating 7 is being overmolded, the turns exerting a retaining action on the overmolding material that has entered the space 8a between the turns, overmolding material being trapped between the turns of the spring 5a.

The helical spring 5a may have a body made of steel or of polyamide 66 which, in the former instance, may or may not be covered, facing the coating 7, with a layer of a material that chemically bonds to the overmolding material. The material of the layer may act as a means of chemical bonding between this material and the overmolding material, this adding to or taking the place of the retention means 8a, 8b whereby overmolding material becomes inserted between the turns of the spring. The overmolding material of which the coating is composed may be fiber-reinforced polyamide 66.

Figure 2:
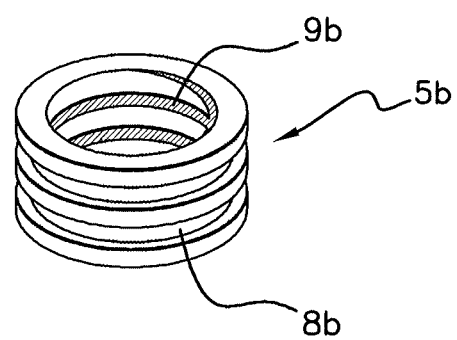
FIG. 2 is a schematic depiction of a view in perspective of a one-piece ring having on its internal periphery a screw thread intended for anchoring in the sleeve and, on its external periphery, grooves intended to retain overmolding material of the coating, this ring representing a second way of embodying the connecting element for a sensor according to an aspect of the present invention, being introduced onto the sleeve by twisting.
Figure 3:
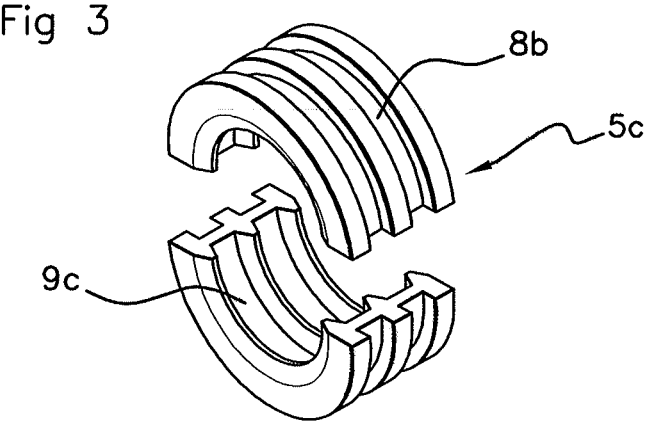
FIG. 3 is a schematic depiction of a view in perspective of a two-part ring having on its internal periphery means for anchoring in the sleeve and, on its external periphery, grooves intended to retain overmolding material of the coating, this two-part ring representing a third way of embodying the connecting element for a sensor according to an aspect of the present invention, being introduced onto the sleeve by clamping.
Figure 4:
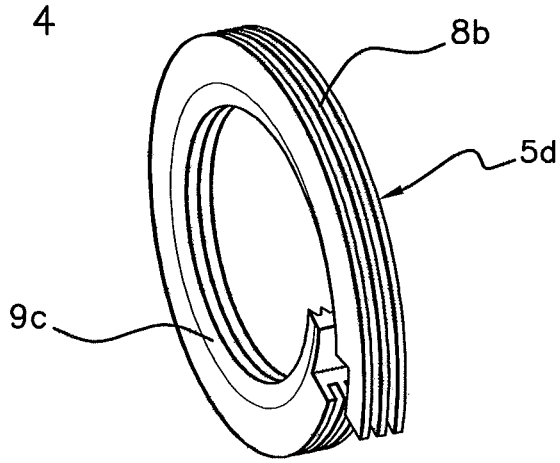
FIG. 4 is a schematic depiction of a view in perspective of an annular member open at its periphery and returned elastically to a clamping position intended for anchoring on the sleeve and having, on its external periphery, grooves intended to retain overmolding material of the coating, this annular member representing a fourth way of embodying the connecting element for a sensor according to an aspect of the present invention

In FIG. 2, the anchoring means are a screw thread 9b borne by the internal periphery of the ring 5b with a closed circumference, the ring 5b being assembled on the end portion of the sleeve 10 by screwing by twisting it on from the end of the sleeve 10. In FIGS. 3 and 4, the anchoring means may be one or more circular striation(s) 9c extending concentrically around the internal periphery of the two-part ring 5c or the member 5d that is open and elastically returned to a clamping position.

The ring 5b, 5c or the member 5c may be made of steel or of plastic, for example polyamide 66. At the external periphery of the ring 5b, 5c or of the member 5d, there may be one or more circumferential grooves 8b, overmolding material entering and becoming retained in the groove or grooves 8b during overmolding. Other means may be implemented for accepting overmolding material on the rings 5b, 5c, for example cavities evenly distributed on the external periphery of the rings 5b, 5c or channel forms that are more complicated than annular grooves, for example channels having receptacles internal to the rings 5b, 5c or to the member 5d.

Figure 5:
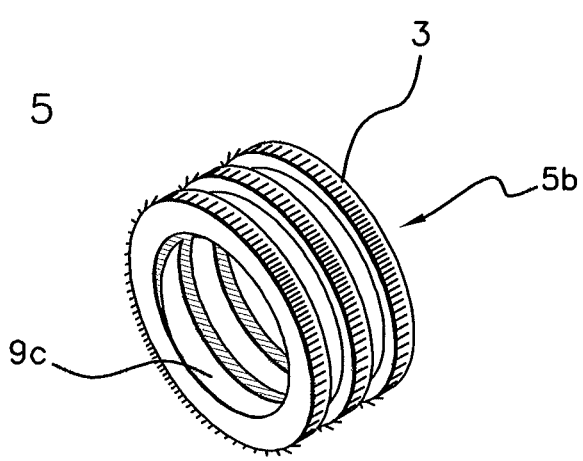
FIG. 5 is a schematic depiction of a view in perspective of a one-piece ring having on its internal periphery a screw thread intended for anchoring in the sleeve and, on its external periphery, slender and elongate fins for remelting into the overmolding material of the coating during overmolding, this ring representing a fifth way of embodying the connecting element for a sensor according to an aspect of the present invention, being introduced onto the sleeve by twisting.

As an alternative or in addition to the grooves 8b or channels, the external periphery of the ring 5b, 5c or of the member 5d may be coated with a plastic compatible with the overmolding material, notably having similar melting points, which may or may not have fins 3 as shown in FIG. 5. In FIG. 5 just one of the fins is referenced 3, but everything stated in respect of the referenced fin applies to all the fins.

With reference to all the figures, the bonding means 3 for bonding the connecting element 5a, 5b, 5c, 5d to the portion of overmolding material of the coating 7 may therefore be means of chemical bonding between a material of at least part of the connecting element 5a, 5b, 5c, 5d and the overmolding material.

For example, it may be advantageous for the material of at least part of the connecting element 5a, 5b, 5c, 5d to have a melting point within plus or minus 15° C. of the melting point of the overmolding material. Said at least part of the connecting element 5a, 5b, 5c, 5d may thus melt and form a mixture with the overmolding material during overmolding when the overmolding material is at a temperature close to its melting point.

These bonding means 3 may be used as an alternative to or in combination with retaining means 8a, 8b which may be means of inserting overmolding material in the connecting element 5a, 5b, 5c, 5d, for example between the turns of a spring 5a or in one or more groove(s) 8b of a ring 5b, 5c, or of a member 5d.

In the first instance, the connecting element 5a, 5b, 5c, 5d may be coated with a layer of material compatible with the overmolding material on an entire portion facing the overmolding material. It may also be possible for all of the connecting element 5a, 5b, 5c, 5d to be made from a material compatible with the overmolding material, such as, for example but not exclusively, polyamide 66.

In FIG. 5, the anchoring means at the internal periphery of a ring 5b are striations 9c, but these means may be selected from any of the anchoring means 9a, 9b, 9c described hereinabove and shown in FIGS. 1 to 4. This FIG. 5 shows a coating of the external periphery of a ring with a plastic compatible with the overmolding material. This plastic has been injected into a mold to form fins 3. This is nonlimiting and the presence of fins 3 on the portion of the periphery of the connecting element 5b facing the overmolding material is not essential.

As shown in FIG. 5, said at least part of the connecting element, in the (nonlimiting) form of a closed ring 5b, is in the form of at least two fins 3 in the shape of tapering spikes with a vertex angle of 10° to 30° and a length varying from 0.7 to 1.5 mm. For preference, a whole series of fins 3 extends around the ring 5b. The fins 3 may point toward the outside radially.

This elongate shape of the fins 3 allows the fin to melt quickly upon contact with the still-hot overmolding material during overmolding. The material of the fins 3 and the overmolding material fuse together locally, ensuring a strong bond between the two materials.

With reference to FIGS. 1 and 5 considered in combination, the fins 3 may pass all around the sleeve 10, being borne by the connecting element 5a and pointing in the opposite direction to the sleeve 10 and therefore toward the overmolding material. Several rings of fins 3 concentric with the sleeve 10 which is cylindrical in shape may also be provided.

It might also be possible for the portions of turns of a spring 5a shown in FIG. 1 to be equipped with fins 3 shown in FIG. 5 facing the overmolding material.

The invention claimed is:

1. An accelerometer sensor with a protective sleeve for electric cables, the sensor comprising:
   a base forming a body containing electronic and electrical components of the sensor,
   a connecting pin projecting from the base and being connected to two electric cables surrounded with the protective sleeve,
   a plastic coating made of an overmolding material and overmolded around an external wall of the base, around the connecting pin and around an end portion of the sleeve adjacent to the connecting pin, said end portion of the sleeve being surrounded by a connecting element, wherein said connecting element is at least partially embedded in the overmolding material of the plastic coating and has:
   on the one hand, means for anchoring to the sleeve which are arranged on the connecting element facing the end portion of the sleeve and,
   on the other hand, means for retaining a portion of the overmolding material or means for bonding to the portion of the overmolding material enveloping said end portion of the sleeve,
   wherein the bonding means for bonding the connecting element to the portion of the overmolding material of the coating are means of chemical bonding between a material of at least part of the connecting element and the overmolding material,
   wherein the retaining means are means of inserting the overmolding material in the connecting element, and
   wherein the anchoring means of the connecting element are means for gripping said end portion of the sleeve or means for locally penetrating said end portion of the sleeve.

2. The sensor as claimed in claim 1, wherein the material of said at least part of the connecting element has a melting point within plus or minus 15° C. of a melting point of the overmolding material.

3. The sensor as claimed in claim 2, wherein said at least part of the connecting element is in the form of at least two fins in the shape of tapering spikes with a vertex angle of 10° to 30° and a length varying from 0.7 to 1.5 mm.

4. The sensor as claimed in claim 1, wherein the connecting element is in a form of a helical spring with turns forcibly engaged on said end portion of sleeve with, at an internal periphery of the spring, the turns of the spring facing said portion of the overmolding material gripping said end portion of the sleeve by static radial compression and, at an external periphery of the spring, the overmolding material entering a space between the turns as the coating is overmolded, the turns exerting a retaining action on the overmolding material that has entered the space between the turns.

5. The sensor as claimed in claim 4, wherein the internal periphery of the spring bears spikes directed toward said end portion of sleeve.

6. The sensor as claimed in claim 5, wherein the helical spring has a body made of steel or of a polyamide 66 which may or may not be covered, facing the coating, with a layer of a material that chemically bonds to the overmolding material.

7. The sensor as claimed in claim 1, wherein the connecting element is in a form of a clamping ring or of a member returned elastically to a clamping position, the ring or the member at least partially surrounding the sleeve, an internal periphery of the ring or of the member comprising a screw thread or one or more striations engaging in said end portion of the sleeve and an external periphery of the ring or of the member comprising at least one groove, the overmolding material entering said at least one groove during overmolding.

8. The sensor as claimed in claim 7, wherein the clamping ring or the member are at least partially made from a plastic that chemically bonds to the overmolding material.

9. The sensor as claimed in claim 4, wherein the helical spring has a body made of steel or of a polyamide 66 which may or may not be covered, facing the coating, with a layer of a material that chemically bonds to the overmolding material.

10. An accelerometer sensor with a protective sleeve for electric cables, the sensor comprising:
a base forming a body containing the electronic and electrical components of the sensor,
a connecting pin projecting from the base and being connected to two electric cables surrounded with the protective sleeve,
a plastic coating made of an overmolding material and overmolded around an external wall of the base, around the connecting pin and around an end portion of the sleeve adjacent to the connecting pin, said end portion of the sleeve being surrounded by a connecting element, wherein said connecting element is at least partially embedded in the overmolding material of the plastic coating and has:
on the one hand, means for anchoring to the sleeve which are arranged on the connecting element facing the end portion of the sleeve, and,
on the other hand, means for retaining a portion of the overmolding material or means for bonding to the portion of the overmolding material enveloping said end portion of sleeve,
wherein the bonding means for bonding the connecting element to the portion of the overmolding material of the coating are means of chemical bonding between a material of at least part of the connecting element and the overmolding material,
wherein the retaining means are means of inserting the overmolding material in the connecting element, and
wherein the connecting element is in a form of a helical spring with turns forcibly engaged on said end portion of sleeve with, at an internal periphery of the spring, the turns of the spring facing said portion of the overmolding material gripping said end portion of the sleeve by static radial compression and, at an external periphery of the spring, the overmolding material entering a space between the turns as the coating is overmolded, the turns exerting a retaining action on the overmolding material that has entered the space between the turns.

11. An accelerometer sensor with a protective sleeve for electric cables, the sensor comprising:
a base forming a body containing the electronic and electrical components of the sensor,
a connecting pin projecting from the base and being connected to two electric cables surrounded with the protective sleeve,
a plastic coating made of an overmolding material and overmolded around an external wall of the base, around the connecting pin and around an end portion of the sleeve adjacent to the connecting pin, said end portion of the sleeve being surrounded by a connecting element, wherein said connecting element is at least partially embedded in the overmolding material of the plastic coating and has:
on the one hand, means for anchoring to the sleeve which are arranged on the connecting element facing the end portion of the sleeve, and,
on the other hand, means for bonding to the portion of the overmolding material enveloping said end portion of sleeve,
wherein the bonding means for bonding the connecting element to the portion of the overmolding material of the coating are means of chemical bonding between a material of at least part of the connecting element and the overmolding material.

* * * * *